United States Patent [19]

Treber et al.

[11] Patent Number: 4,542,926
[45] Date of Patent: Sep. 24, 1985

[54] DECORATIVE OR PROTECTIVE MOLDING FOR A VEHICLE BODY

[75] Inventors: Willi O. Treber, Wuppertal; Günter Fritsch, Ennepetal, both of Fed. Rep. of Germany

[73] Assignee: Gebr. Happich GmbH, Fed. Rep. of Germany

[21] Appl. No.: 544,439

[22] Filed: Oct. 21, 1983

[30] Foreign Application Priority Data

Nov. 12, 1982 [DE] Fed. Rep. of Germany ....... 3241906

[51] Int. Cl.$^4$ .............................................. B60R 13/04
[52] U.S. Cl. ..................................... 293/128; 52/716; 280/770
[58] Field of Search .................. 293/128; 52/716, 718, 52/717; 280/770

[56] References Cited

U.S. PATENT DOCUMENTS

| 3,606,433 | 9/1971 | Kunevicius | 293/128 |
| 3,897,967 | 8/1975 | Barenyi | 293/128 |
| 4,246,303 | 1/1981 | Townsend | 293/128 |

FOREIGN PATENT DOCUMENTS

| 1689710 | 11/1954 | Fed. Rep. of Germany . |
| 1713780 | 5/1955 | Fed. Rep. of Germany . |
| 1186756 | 2/1965 | Fed. Rep. of Germany . |
| 2539063 | 3/1977 | Fed. Rep. of Germany . |
| 2217945 | 9/1974 | France . |

Primary Examiner—Robert R. Song
Attorney, Agent, or Firm—Ostrolenk, Faber, Gerb & Soffen

[57] ABSTRACT

A decorative or protective molding which is fastened to the body of an automotive vehicle, e.g. by an adhesive. The molding is comprised of two separate parts which are assembled. The first part is a molding body which is fastened to the vehicle surface. The molding body has a peripheral groove at its base surface, which is wedge-shaped for receiving the second part, a frame, therein. The frame wraps around the periphery of the molding body and extends into the groove. The frame is comprised of an elastic material. The frame is profiled to the molding body where they meet for making a smooth unprofiled transition between them at the exterior of the molding body. The groove may have an undercut in it for holding the frame in the groove.

19 Claims, 9 Drawing Figures

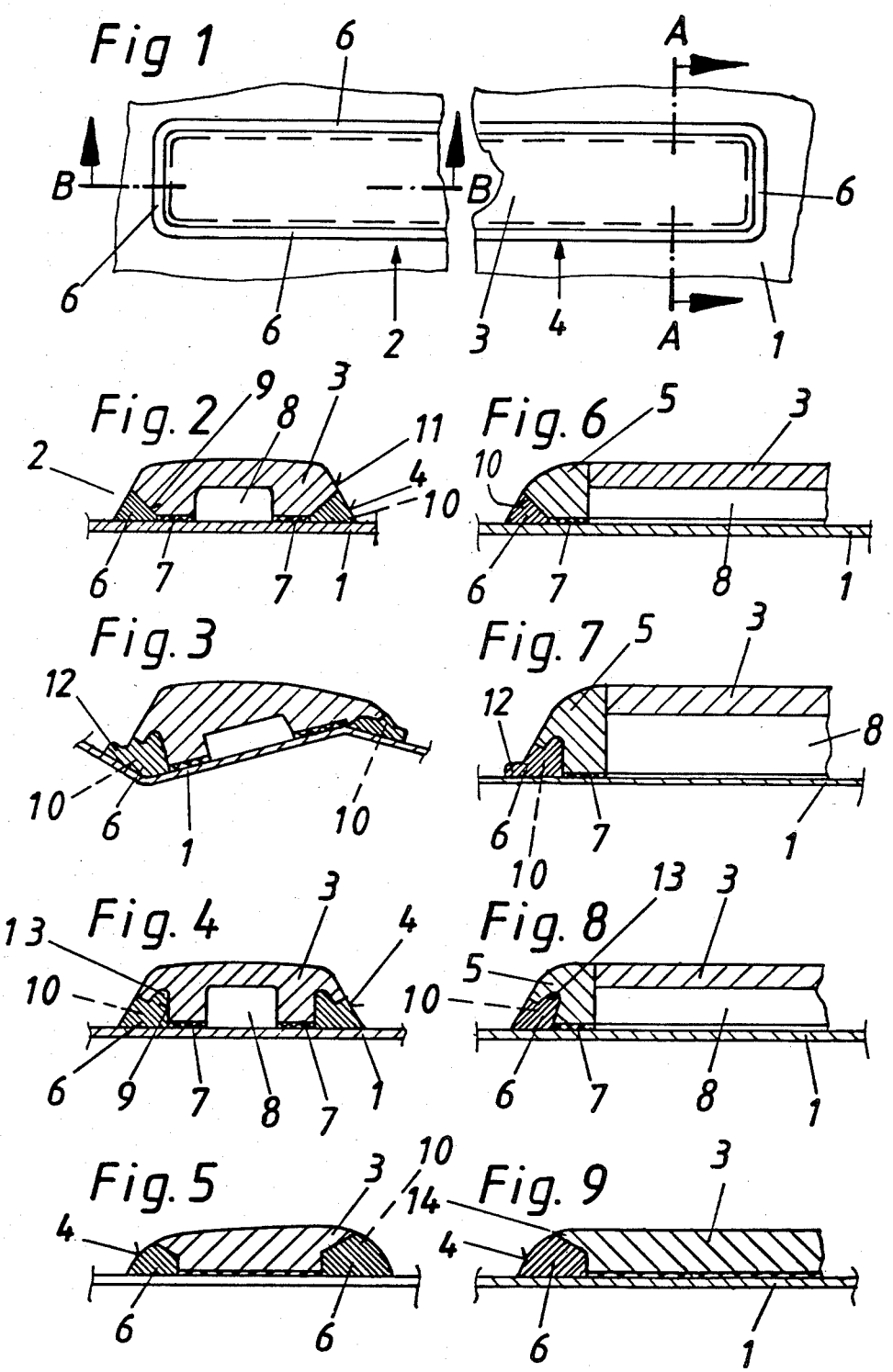

DECORATIVE OR PROTECTIVE MOLDING FOR A VEHICLE BODY

BACKGROUND OF THE INVENTION

The present invention relates to a decorative or protective molding to be attached to a vehicle or car body.

It is customary to provide the side surfaces and doors of automobile bodies with plastic impact and decorative moldings to protect the bodies from external blows and impacts. These decorative or protective moldings are permanently fastened to the car bodies by adhesive. The moldings have decorative coverings such as decorative films, metal foils, and the like. Bonding of the moldings to the car bodies avoids the disadvantages of the previous types of attachment, in which the moldings were fastened by means of clips, screws, clamps, or the like which are adapted to be introduced in holes in the body. Rust could easily form in the region of the holes.

Other problems are presented even when car bodies have moldings bonded to them. One main problem is that needed repainting or touch-up painting is made considerably difficult or even impossible without visible paint termination marks on the edges of the moldings. The fact that until now bodies having bonded moldings have not been able to gain substantial acceptance is to be ascribed to this circumstance. This is eliminated by the present invention.

SUMMARY OF THE INVENTION

The object of the present invention is to shape and develop a car body and/or the molding such that despite the presence of attached moldings, it is possible to perform repainting or touch-up painting jobs without visible paint termination marks.

According to the invention, the molding is comprised of two separately produced molding parts. One is developed as a molding body which is fastened, e.g. bonded by adhesive, to the car body, and the other is developed as a frame of rubber or of a material having rubber-elastic properties, which rests against the car body and surrounds the periphery of the first part. That edge region of the frame, which is adjacent the central opening in the frame, engages in a peripherial groove provided on the peripheral edge of the molding body.

It is possible to complete the car body or molding after the repainting by placing the rubber-elastic frame over the molding body and thereby covering the paint-termination marks on the longitudinal edges and ends of the molding. The two-part molding bonded to the car body also permits easy touch-up painting. It is merely necessary to temporarily remove the frame from the molding body and to then reapply it after the touch-up painting.

The invention can be employed to advantage with car bodies of either metal or plastic and with moldings whose bodies, which are shaped in accordance with the invention to hold a frame, are comprised of rubber or of plastic of blown or foamed type.

As further features of the invention, the groove in the molding body is a continuous cutout between the periphery of the molding body and the base surface of the molding body which rests against the vehicle or car body. The groove may be wedge-shaped and/or may include an inner wall which is bent at an oblique angle with respect to the base surface of the molding body in which the groove is defined.

Inside the groove, there may be a widened section, which is of greater height above the surface of the vehicle than the adjacent part of the groove, which defines an undercut in the groove which is spaced inwardly from the periphery of the molding body.

The molding frame is selectively comprised of a single piece which extends around the entire periphery of the body, or it is comprised of a plurality of lengths of profiled strips which meet at their ends to define the complete frame. The frame material is selected from the appropriate elastic material. For securely holding the frame in the groove in the body, it would be smaller in total dimensions around the periphery of the body in the groove than the dimensions of the periphery of the body in the groove itself in which the frame is positioned. The frame cross-sectional profile would usually correspond to that of the cross-sectional profile of the groove in the molding body in which the frame seats. The frame may have a constant cross-section around the molding body or may have different cross-sectional profiles over different regions of the body. Also, the frame is shaped to fit in the groove, so that at the interface of the molded body and the frame, there is a continuous profile without a profile transition.

Embodiments of the invention are explained in further detail below with reference to the accompanying drawings.

BRIEF DESCRIPTION OF THE DRAWINGS

FIG. 1 shows a portion of a car body with a molding arranged on it;

FIGS. 2–5 show different cross-sectional shapes of moldings, seen approximately along the section line A—A in FIG. 1; and FIGS. 6–9 show different longitudinal shapes of moldings, seen approximately along the section line B—B in FIG. 1.

DESCRIPTION OF THE PREFERRED EMBODIMENTS

FIG. 1 shows a portion 1 of a car body having a molding 2 fastened to it by an adhesive. The molding 2 has a two-part structure and comprises an elongated molding body 3 and a peripheral frame 4 which surrounds the periphery of the molding body 3.

The molding body 3 may be comprised of any material suitable for an adhesive molding and may be produced by extrusion, by injection molding or by blow molding. The molding body is preferably comprised of PVC (polyvinylchloride). The molding body 3 may, for instance, be coated with a pressure-sensitive adhesive for attachment to the car body. The molding body 3 may furthermore include end pieces 5 which are molded, bonded or otherwise attached to the body 3 (see FIGS. 6–8) or it may also have cut ends, as shown in FIG. 9.

The frame 4 is comprised of rubber or of a material having rubber-elastic properties. In general, the frame may be comprised of rubber, foam rubber, elastic PVC or foam PVC. The frame 4 may be extruded in a single piece. Alternatively, the frame may also be formed of individual frame strips 6, which strips 6 are bonded, welded, vulcanized or otherwise undetachably connected to each other at their points of abutment and/or overlap which are at their adjacent ends. The main factor is that the frame should be a single coherent structure whose frame strips 6 possess longitudinal elasticity.

FIG. 2 shows a section along the line A—A of FIG. 1, showing the arrangement of the molding 2 on the portion 1 of the car body. The molding body 3 is fastened to the car body 1 by a suitable adhesive 7, or by a double-sided adhesive tape. The molding body 3 is provided on its side applied to the car body with a central, deep groove 8 which extends from end piece 5 to end piece 5. The groove saves weight and material and improves the bumper effect.

The peripherally extending edge of the molding body 3 has a cutout 9, which extends obliquely inward and terminates at the portion 1 of the body. This cutout 9 forms with the body 1 a peripheral groove 10 which receives that region at the edge of the frame 4 which is adjacent the frame opening. The peripheral groove 10 is developed along the entire periphery as seen by the cross-sectional view of FIG. 2 and the corresponding longitudinal section of FIG. 6. In the embodiment shown in FIGS. 2 and 6, the peripheral groove 10 tapers in wedge shape from the outside towards the inside of the body 3.

The frame moldings 6 of the either single-piece or composite frame 4 have a triangular cross-section in this embodiment. The frame is shaped, on the one hand, to completely fill the peripheral groove 10 and, on the other hand, to provide an entirely smooth transition between the peripheral edge 11 of the body 3 and the outer surface, which is still visible in the installed position, of the frame moldings 6 of the frame 4. It is readily possible optionally to match the color of the molding body 3 and of the frame 4 to each other or to provide any desired color contrast.

The cross-sectional view of the embodiment of FIG. 3 shows that, within the scope of the invention, a suitable bending of the car body 1, can produce the peripheral groove 10 solely by a correspondingly chamfered development of the body 1, as indicated on the right-hand side of FIG. 3, or else can contribute substantially to the formation of the peripheral groove 10, as shown in the left-hand side of FIG. 3. FIG. 3 furthermore shows that the frame 4 need not necessarily have the same cross-sectional profile at each point. Instead, for given conditions of installation, it may be advantageous for the frame strips 6 to have cross-sectional profiles which differ from each other.

The embodiment of FIG. 7 essentially corresponds to that of FIG. 6. The difference resides merely in the sealing lip 12 at the outer edge of the frame 4 of FIG. 7.

In the embodiment of FIGS. 4 and 8, the peripheral groove 10 formed by the cutout 9 in the molding body 3 has an internal undercut 13 of greater height above the car body than the adjacent area of the groove in order to better anchor the frame 4. Furthermore, in this embodiment the same basic shape is used as the one explained in detail with reference to FIGS. 1 and 6.

In the embodiments described above, the molding bodies 3 were hollow. But in the embodiment of FIGS. 5 and 9, the molding body 3 is solid, having cut edges 14 at its end instead of separate bent attached end pieces 5.

To mount the molding body 3, it is first bonded onto the car body 1. Only after repainting has been completed or one is certain that it is not necessary, the frame 4 is attached by simply placing it over the peripheral edge 11 of the molding body 3, thus completing the molding 2. The frame 4 is reliably held in the peripheral groove 10, particularly if it is attached with a certain initial tension. But the frame 4 can nevertheless be rapidly and simply removed, if necessary, for instance for touch-up painting and can then be attached again.

Although the present invention has been described in connection with a number of preferred embodiments thereof, many variations and modifications will now become apparent to those skilled in the art. It is preferred, therefore, that the present invention be limited not by the specific disclosure herein, but only by the appended claims.

What is claimed is:

1. A molding for application to an automotive vehicle, comprising:

a molding body, having a surface for being fastened to a surface of the vehicle; the body having a periphery when it is fastened to the vehicle and further being shaped for providing a peripheral groove between the body and the vehicle surface around the periphery of the body;

a frame comprised of a material having elastic properties for being removably mounted in a position surrounding the periphery of the body and resting against the vehicle; the frame having an inner edge region which faces in toward the periphery of the body and which is received in the peripheral groove when the frame is mounted; the frame being sufficiently elastic that it may be removed from the mounted position and returned to the mounted position while the molding body is fastened to the vehicle surface.

2. The molding of claim 1, wherein the groove is developed at the side of the body toward the surface of the body which is fastened to the vehicle, so that the frame is supported in the groove between the molding body and the surface of the vehicle.

3. The molding of claim 2, wherein the surface of the body which is fastened to the vehicle is the base surface thereof, and the groove is a continuous cutout extending between the periphery of the body and the base surface of the body.

4. The molding of claim 3, wherein at its periphery at the base surface, the body has an inner wall which is bent at an oblique angle with respect to the base surface for defining the groove.

5. The molding of claim 4, wherein the frame inner edge region which is received in the groove has a cross-sectional profile which is shaped for mating with the cross-sectional profile of the groove.

6. The molding of claim 2, wherein the groove is generally wedge-shaped, tapering from the periphery of the body in toward the middle of the body and the base surface of the body.

7. The molding of claim 6, wherein the groove includes a widened section, of greater height above the vehicle than the adjacent region of the groove, and spaced in from the periphery of the body.

8. The molding of claim 2, wherein the groove includes a widened section, of greater height above the vehicle than the adjacent region of the groove, and spaced in from the periphery of the body.

9. The molding of claim 8, wherein the widened section is an undercut in the body to define the widened section.

10. The molding of claim 2, wherein the material of the frame is selected from the group of materials consisting of rubber, foam rubber, foam PVC and elastic PVC.

11. The molding of claim 2, wherein the frame is a single piece.

12. The molding of claim 2, wherein the frame is comprised of a plurality of lengths of profiled strip assembled to define the frame and adjacent lengths of the strip meet at their respective adjacent ends, the adjacent ends being undetachably connected.

13. The molding of claim 12, wherein the lengths of the profiled strip are of the same constant cross-section.

14. The molding of claim 12, wherein the lengths of the profiled strip are of different respective cross-sectional profiles.

15. The molding of claim 2, wherein the frame has an inner edge region which is received in the groove, and the inner edge region has a cross-sectional profile which is shaped for mating with the cross-sectional profile of the groove.

16. The molding of claim 15, wherein the body has a peripheral edge around its periphery at that outside edge of the groove that is spaced from the vehicle; the frame in the groove being shaped to adjoin that peripheral edge of the body without a profile transition between the body and the frame, whereby at that peripheral edge, the body and the frame have a continuous profile.

17. The molding of claim 2, wherein the body has a peripheral edge around its periphery at that outside edge of the groove that is spaced from the vehicle; the frame in the groove being shaped to adjoin that peripheral edge of the body without a profile transition between the body and the frame, whereby at that peripheral edge, the body and the frame have a continuous profile.

18. The molding of claim 17, wherein at its peripheral edge, the body is descending toward the vehicle.

19. The molding of claim 2, wherein the frame is smaller in its dimension extending around the groove in the periphery of the body than the dimensions of the groove in which the frame is positioned.

* * * * *